United States Patent
Gueneau et al.

(10) Patent No.: US 11,572,186 B2
(45) Date of Patent: Feb. 7, 2023

(54) ASSEMBLY FOR AN AIRCRAFT HAVING A WING AND AN ENGINE PYLON FOR COUPLING A JET ENGINE TO SAID WING

(71) Applicant: Airbus Operations SAS, Toulouse (FR)

(72) Inventors: Germain Gueneau, Toulouse (FR); Michael Berjot, Toulouse (FR); Olivier Pautis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/375,393

(22) Filed: Jul. 14, 2021

(65) Prior Publication Data
US 2022/0017229 A1    Jan. 20, 2022

(30) Foreign Application Priority Data
Jul. 17, 2020   (FR) .................................... 2007496

(51) Int. Cl.
*B64D 27/26*    (2006.01)
*B64C 3/32*    (2006.01)
(Continued)

(52) U.S. Cl.
CPC .............. *B64D 27/26* (2013.01); *B64C 3/185* (2013.01); *B64C 3/187* (2013.01); *B64C 3/32* (2013.01);
(Continued)

(58) Field of Classification Search
CPC .. B64D 27/26; B64D 27/16; B64D 2027/264; B64D 2027/266; B64D 2027/268; B64C 3/185; B64C 3/187; B64C 3/32
See application file for complete search history.

(56) References Cited

U.S. PATENT DOCUMENTS 4,560,122 A * 12/1985 Parkinson .............. B64D 27/18
                                                          244/54
8,205,825 B2 * 6/2012 Huggins ................ B64D 27/26
                                                          244/54
(Continued)

FOREIGN PATENT DOCUMENTS

| EP | 0115914 A1 | 8/1984 |
|----|------------|--------|
| FR | 3012793 A1 | 5/2015 |
| FR | 3099464 A1 | 2/2021 |

OTHER PUBLICATIONS

French Search Report; priority document.

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An assembly for an aircraft that has a wing and an engine pylon having a primary structure with right-side and left-side panels, an upper and a lower spar and a rear rib, two sets of upper or lower shackles, one set fastening the right-side panel to the wing, and a second set fastening the left-side panel to the wing, a fastening element secured to the rear rib or to the lower spar, a rear rod connecting the fastening element to the wing, a transverse shackle connecting the upper spar to the wing, a line connecting two centers of the transverse shackle being oriented transversely relative to a longitudinal axis of the engine pylon, and a reinforcing panel, at each joint between a right-side or left-side panel and an upper or lower shackle, which is fastened along a height against the panel and to which the shackle is also fastened.

8 Claims, 4 Drawing Sheets

(51) Int. Cl.
*B64D 27/16* (2006.01)
*B64C 3/18* (2006.01)
(52) U.S. Cl.
CPC ........ B64D 27/16 (2013.01); *B64D 2027/264* (2013.01)

(56) References Cited

U.S. PATENT DOCUMENTS

| | | |
|---|---|---|
| 2016/0221682 A1 | 8/2016 | Pautis et al. |
| 2016/0244174 A1 | 8/2016 | Pautis |
| 2016/0290391 A1 | 10/2016 | Hill et al. |
| 2021/0101689 A1 | 4/2021 | Blanc et al. |

* cited by examiner

ASSEMBLY FOR AN AIRCRAFT HAVING A WING AND AN ENGINE PYLON FOR COUPLING A JET ENGINE TO SAID WING

CROSS-REFERENCES TO RELATED APPLICATIONS

This application claims the benefit of the French patent application No. 2007496 filed on Jul. 17, 2020, the entire disclosures of which are incorporated herein by way of reference.

FIELD OF THE INVENTION

The present invention relates to an assembly for an aircraft that has a wing and an engine pylon for mounting a jet engine beneath the wing, and to an aircraft having a jet engine and such an assembly for mounting the jet engine beneath the wing.

BACKGROUND OF THE INVENTION

Usually, for an aircraft, a propulsion assembly has a jet engine that is fastened beneath a wing of the aircraft with the aid of an engine pylon. The engine pylon is generally made up of a primary structure formed of a box made up of an upper spar, a lower spar and two lateral panels connecting the two spars, and internal ribs distributed along the box.

The jet engine is fastened beneath the engine pylon by means of engine attachments that conventionally comprise, at the front, a front engine attachment, at the rear, a rear engine attachment, and between the front and rear engine attachments, an assembly for reacting thrust force comprising reaction rods, which are fastened both to the jet engine and to a shoe secured to the primary structure of the pylon, for absorbing the thrust forces generated by the jet engine.

A fastening system fastens the engine pylon to the wing. This fastening system reacts and absorbs the bending moments and the shear loads at the interface of the engine pylon with the wing. An example of such an assembly is described in the document US-A-2016/0221682.

In conventional designs, the primary box and the primary structure have complex shapes and the fastening system is relatively bulky, and it is therefore desirable to find an installation that makes it possible to reduce the dimensions of the various components.

SUMMARY OF THE INVENTION

An object of the present invention is to propose an assembly for an aircraft having a wing and an engine pylon for mounting a jet engine beneath the wing and that has means for fastening to the wing that are more compact.

To this end there is proposed an engine pylon for mounting a jet engine beneath a wing of an aircraft, the engine pylon having:
  a primary structure forming a box and having a right-side lateral panel, a left-side lateral panel, an upper spar, a lower spar and a rear rib that closes the box at the rear,
  a first and a second set of upper shackles, wherein the first set of upper shackles fastens, in use, the right-side lateral panel to a structural element of the wing, and wherein the second set of upper shackles fastens, in use, the left-side lateral panel to a structural element of the wing,
  a first and a second set of lower shackles, wherein the first set of lower shackles fastens, in use, the right-side lateral panel to a structural element of the wing, and wherein the second set of lower shackles fastens, in use, the left-side lateral panel to a structural element of the wing,
  a fastening element secured to either the rear rib or the lower spar,
  a rear rod that connects the fastening element to a structural element of the wing, and
  a transverse shackle that connects the upper spar to a structural element of the wing, wherein the line connecting the two centers of the transverse shackle is oriented transversely with respect to a longitudinal axis of the engine pylon,
  a reinforcing panel, at each join between a right-side or left-side lateral panel and a shackle of the first or second set of upper or lower shackles, which is fastened along the height against the right-side or left-side lateral panel and to which the shackle of the first or second set of upper or lower shackles is also fastened.

With such an engine pylon, it is then possible to obtain an isostatic assembly and a fastening system having reduced bulk.

Advantageously, the upper shackles of the first and the second sets of upper shackles are oriented with an inclination of between 0° and 45° with respect to a purely horizontal axis, and they are preferably oriented more or less horizontally.

Advantageously, the shackles of the first and the second sets of upper shackles are each aligned in the continuation of the lateral panel to which they are fastened.

Advantageously, the lower shackles of the first and the second sets of lower shackles are oriented with an inclination of between 0° and 30° with respect to a purely vertical axis, and they are preferably oriented more or less vertically.

Advantageously, the shackles of the first and the second sets of lower shackles are each aligned in the continuation of the lateral panel to which they are fastened.

The invention also proposes an aircraft having a jet engine and an assembly according to one of the preceding variants, wherein the jet engine is fastened beneath the engine pylon.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
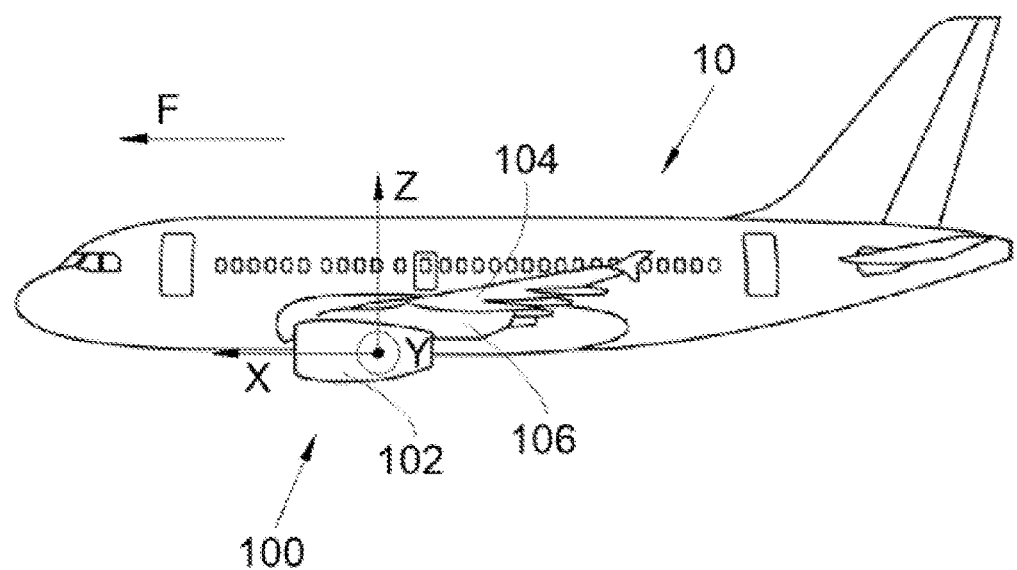
FIG. 1 is a side view of an aircraft according to the invention.

FIG. 1 shows an aircraft 10, which has a propulsion system 100 with a jet engine 102 fastened to a wing 104 of the aircraft 10 by way of an engine pylon 106. The wing 104 and the engine pylon 106 form an assembly according to the invention and the jet engine 102 is fastened beneath the engine pylon 106.

In the following description, terms relating to a position are considered in relation to an aircraft in a normal flight position, i.e., as shown in FIG. 1 and the "front" and "rear" positions are considered relative to the front and the rear of the jet engine and relative to the direction of forward movement F of the aircraft 10 when the jet engine 102 is in operation.

In the following description, and by convention, the X direction is the longitudinal direction of the jet engine, which is parallel to the longitudinal axis of the jet engine, the Y direction is the transverse direction, which is horizontal when the aircraft is on the ground, and the Z direction is the vertical direction, which is vertical when the aircraft is on the ground, these three directions X, Y and Z being mutually orthogonal.

The jet engine 102 has a shape exhibiting symmetry of revolution about its longitudinal axis.

Figure 2:
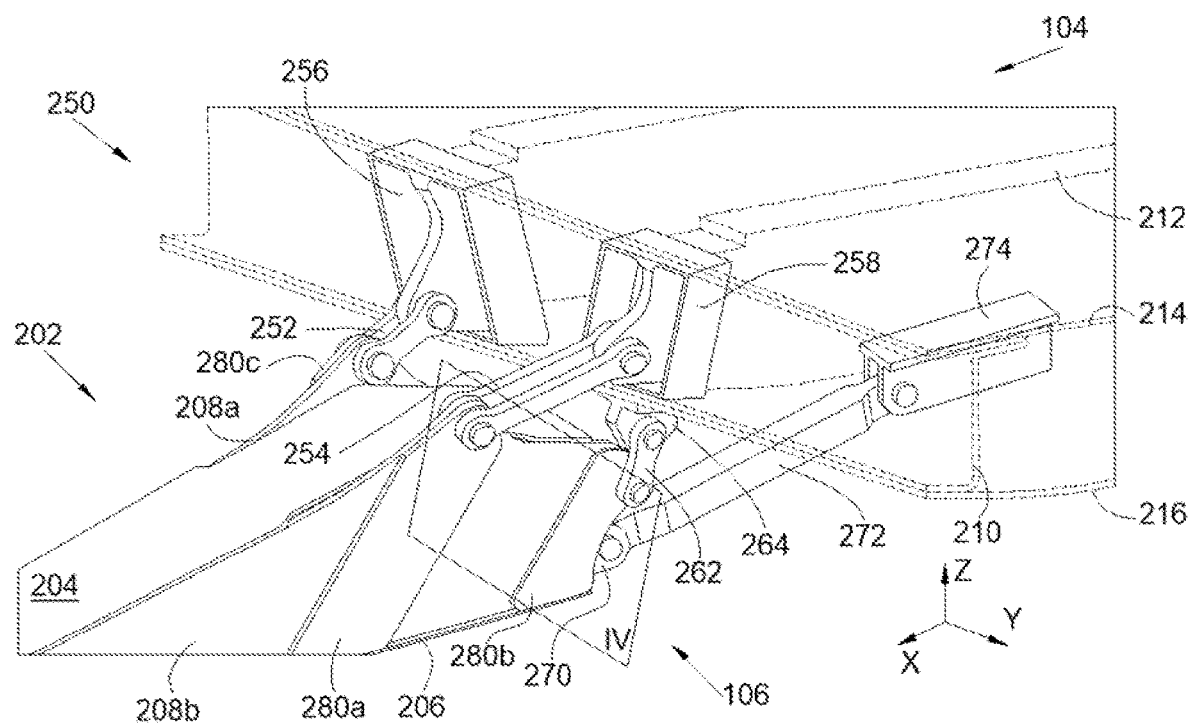
FIG. 2 is a perspective side view of an engine pylon according to a first embodiment of the invention, fastened to a wing of the aircraft.

As shown in FIG. 2, the engine pylon 106 comprises a rigid structure 202 forming a box, also called the primary structure. The primary structure 202 is formed of an upper spar 204, a lower spar 206 and two lateral panels 208a-b connecting the two spars 204 and 206. The primary structure 202 can also have internal ribs distributed inside the primary structure 202 and fastened to the spars 204 and 206 and to the lateral panels 208a-b. There is thus a right-side lateral panel 208a and a left-side lateral panel 208b. According to a configuration that is not shown in the figures, the upper spar 204 is substantially flat, i.e., the upper spar 204 is not bent.

FIG. 2 also shows the structure of the wing 104, which is shown in dash-dotted line. The structure of the wing 104 has a front spar 210 and ribs 212. The front spar 210 is generally in a plane parallel to the YZ plane and the ribs 212 are generally in planes parallel to the XZ plane. The structure of the wing 104 is covered by a suction-side panel 214 and a pressure-side panel 216 that are fastened to the structure.

In the embodiment of the invention that is shown here, the primary structure 202 is made of metal, but it could also be made of composite materials.

The primary structure 202 supports the jet engine 102 by way of engine attachments that can be of conventional design, such as those disclosed in the document US-A-2016/0221682.

Figure 3:
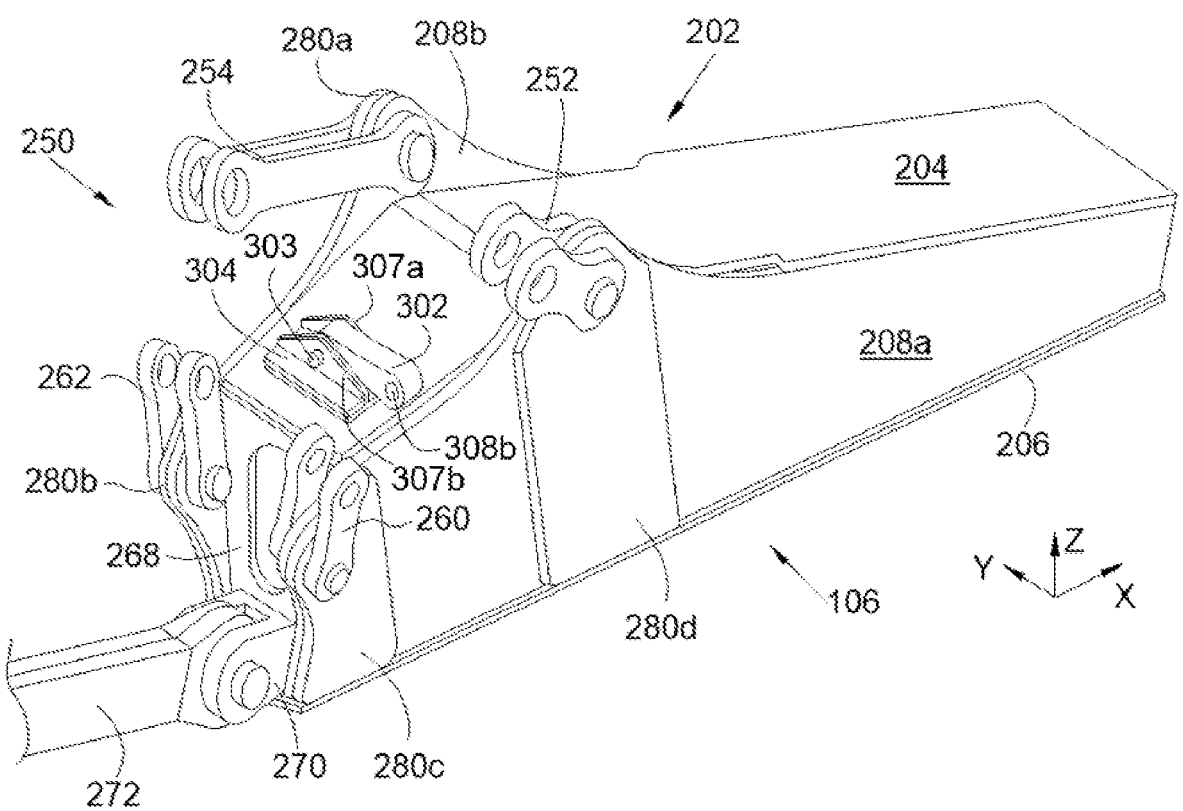
FIG. 3 shows a perspective view, from the other side, of the engine pylon according to the first embodiment of the invention.
Figure 4:
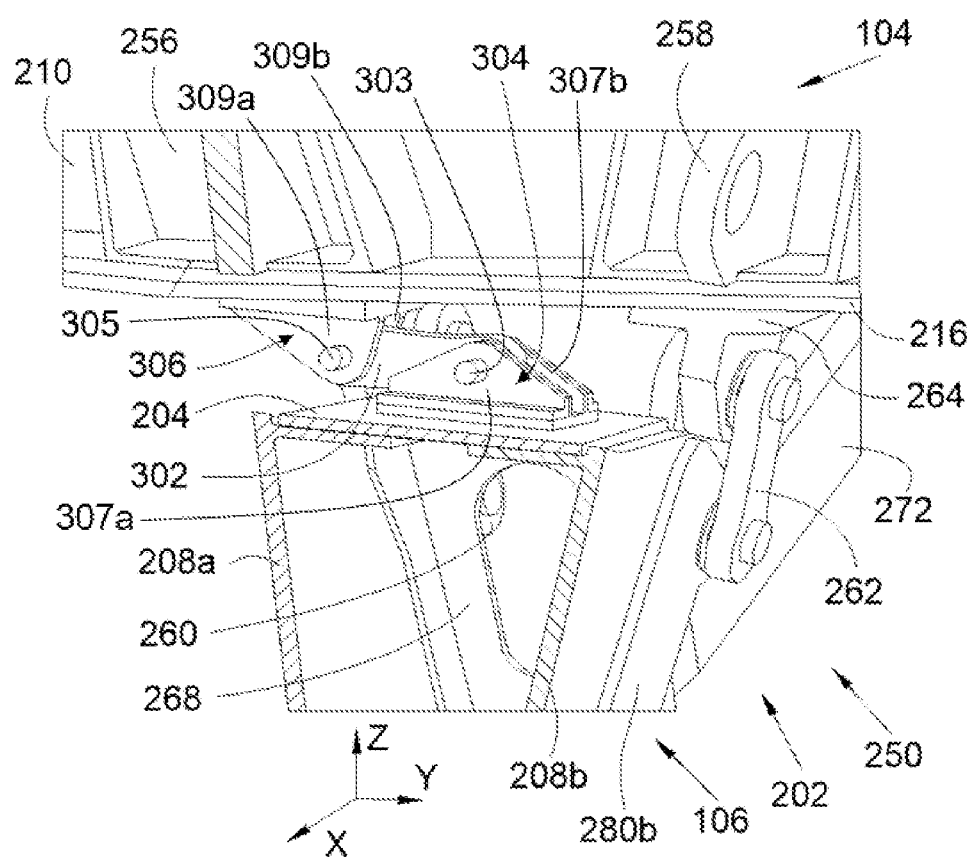
FIG. 4 shows a perspective front view, in cross section, of the engine pylon according to the first embodiment of the invention, wherein the cross section corresponds to the plane IV in FIG. 2.

FIGS. 2, 3 and 4 show a fastening system 250 of the engine pylon 106 that connects the engine pylon 106 to the wing 104.

The fastening system 250 has a first and a second set of upper shackles or links 252 and 254 that provide a double shear joint/connection.

In use, the first set of upper shackles 252 links, i.e., fastens, in use, the right-side lateral panel 208a to a structural element 210 of the wing 104. In this case, the structural element of the wing 104 is the front spar 210 and the connection/joining is effected by way of a first support 256 that is fastened to the structural element 210 of the wing 104.

In use, the second set of upper shackles 254 links, i.e., fastens, in use, the left-side lateral panel 208b to a structural element 210 of the wing 104. In this case, the structural element of the wing 104 is the front spar 210 and the connection is effected by way of a second support 258 that is also fastened to the structural element 210 of the wing 104.

The first support 256 and the second support 258 in this case take the form of fittings that are fastened at the front to the front spar 210.

The upper shackles 252 and 254 are joined to the lateral panels 208a-b and the supports 256, 258 by bolts or other structures that extend through orifices in various elements.

The upper shackles 252 and 254 are oriented on the XZ plane and each of them is aligned with a core of a rib 212 of the wing 104 and with the lateral panel 208a-b to which it is fastened. More specifically, each upper shackle 252, 254 extends parallel to one of the lateral panels 208a-b, and is aligned in the continuation of the lateral panel 208a-b.

Thus, the upper shackles 252 and 254 are, on the side of the pylon, each aligned in the continuation of the lateral panel 208a-b to which they are fastened, and, on the side of the wing 104, positioned facing at least one structural element 210 of the wing 104 along a horizontal longitudinal axis.

The upper shackles 252 and 254 are oriented more or less horizontally, i.e., the line connecting the two centers of a single upper shackle 252, 254 is more or less horizontal. Nevertheless, these upper shackles 252 and 254 could be oriented with an inclination of between 0° and 45° with respect to a purely horizontal axis.

The fastening system 250 comprises a first and a second set of lower shackles or links 260 and 262.

In use, the first set of lower shackles 260 fastens the right-side lateral panel 208a to a structural element 210, 216 of the wing 104. In this case, the structural element 210, 216 of the wing 104 is the front spar 210 across the pressure-side panel 216 and the connection is effected by way of a first additional support that is fastened to the structural element 210, 216.

In use, the second set of lower shackles 262 fastens the left-side lateral panel 208b to a structural element 210, 216 of the wing 104. In this case, the structural element 210, 216 of the wing 104 is the front spar 210 across the pressure-side panel 216 and the connection is effected by way of a second additional support 264 that is also fastened to the structural element 210, 216 of the wing 104. In FIGS. 2 to 4, only the additional support 264 corresponding to the second set of lower shackles 262 is visible.

The first additional support and the second additional support 264 in this case take the form of fittings that are fastened beneath the front spar 210 across the pressure-side panel 216.

The lower shackles 260, 262 are joined to the lateral panels 208a-b and the additional supports 264 by bolts or other structures that extend through orifices in various elements.

Each lower shackle 260, 262 is oriented in the Z direction and aligned with the core of the front spar 210 of the wing 104 and the lateral panel 208a-b to which it is fastened. More specifically, each lower shackle 260, 262 extends parallel to one of the lateral panels 208a-b, and is aligned in the continuation of the lateral panel 208a-b.

Thus, the lower shackles 260, 262 are, on the side of the pylon, each aligned in the continuation of the lateral panel 208a-b to which they are fastened, and, on the side of the wing 104, positioned facing at least one structural element 210, 216 of the wing 104 along a vertical axis.

The lower shackles 260 and 262 are oriented more or less vertically, i.e., the line connecting the two centers of a single lower shackle 260, 262 is more or less vertical. Nevertheless, these lower shackles 260 and 262 could be oriented with an inclination of between 0° and 30° with respect to a purely vertical axis.

The primary structure 202 has a rear rib 268 that closes the box at the rear between the lateral panels 208a-b.

The fastening system 250 also has a fastening element 270 that, according to a first embodiment shown in FIGS. 2 to 4, is secured to the rear rib 268 and oriented on the outside of the box and towards the rear. In this first embodiment, the fastening element 270 takes the form of a rear clevis.

Figure 5:
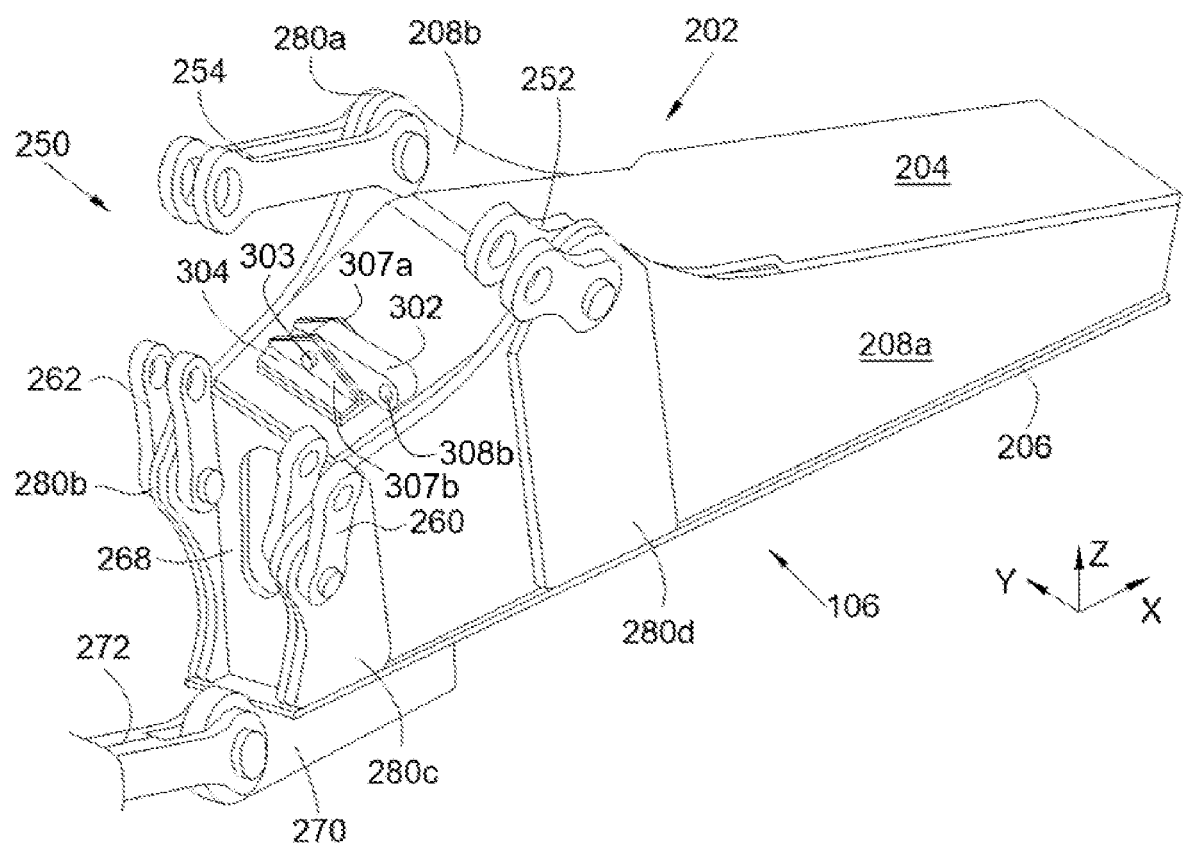
FIG. 5 shows a perspective side view of an engine pylon according to a second embodiment of the invention.

In a second embodiment shown in FIG. 5, the fastening element 270 is secured to the lower spar 206 and takes the form of a blade that extends in the longitudinal continuation of the lower spar 206 and is oriented on the outside of the box and towards the rear.

The fastening system 250 also has a rear rod 272 that connects, in use, the fastening element 270 to a structural element of the wing 104, and that is oriented in the XZ plane.

The rear rod 272 has a first end mounted in an articulated manner on the fastening element 270 and a second end mounted in an articulated manner on a fitting 274 fastened to the structural element of the wing 104, in particular in this case to the pressure-side panel 216 of the wing 104. The rear rod 272 is in this case connected to the structural element by way of the fitting 274.

The longitudinal direction of the rear rod 272, i.e., the line connecting the centers of the two articulations of the rear rod 272, is generally tangential to the pressure-side panel at the connection to the wing 104, i.e., at the fitting 274. On the other hand, in order to safeguard against cases of breaking and propagation (known as "failure mode"), the rear rod 272 may be made up of two cores that are separate but are connected to one another by a conventional bolting system (not described in detail here) so as to form only one component working according to the various cases and loading conditions. The rear rod 272 can also have cutouts (not shown in the figures), in order to reduce the weight of the fastening system.

The fastening system 250 also comprises a transverse shackle 302 (seen only in FIGS. 3, 4 and 5) that is oriented in a transverse direction Y of the engine pylon 106 and that connects, in use, the upper spar 204 of the engine pylon 106 to a structural element of the wing 104, and more particularly in this case to the pressure-side panel 216.

The transverse shackle 302 is oriented in the Y direction, i.e., transversely with respect to the longitudinal axis of the engine pylon 106, and it is practically parallel to the pressure-side panel 216. One end of the transverse shackle 302 is connected to the upper spar 204 by way of a first clevis 304 fastened to the upper spar 204, and the other end of the transverse shackle 302 is connected to the pressure-side panel 216 by way of a second clevis 306 fastened to the pressure-side panel 216. More specifically, one end of the transverse shackle 302 is connected to the upper spar 204 by means of a pin 303 that extends substantially along the X axis, and by way of the first clevis 304, and the other end of the transverse shackle 302 is connected to the pressure-side panel 216 of the wing 104 by means of a pin 305 that extends substantially along the X axis, and by way of the second clevis 306. The pin 303 passes through a first lug 307a of the first clevis 304, then a first opening in the transverse shackle 302 that opens along the X axis, and finally a second lug 307b of the first clevis 304. The pin 305 passes through a first lug 309a of the second clevis 306, then a second opening 308b in the transverse shackle 302 that opens along the X axis, and finally a second lug 309b of the second clevis 306. The line connecting the two centers (openings) of the transverse shackle 302 is oriented transversely with respect to the longitudinal axis of the engine pylon 106. For example, the line connecting the two centers of the transverse shackle 302 is oriented substantially along the Y axis.

Consequently, with such a fastening system 250, the reaction of the bending moment about the Z axis, referred to as "Mz", is ensured by the combined loading of the two upper shackles 252 and 254 and of the transverse shackle 302, the reaction of the torsional moment about the X axis, referred to as "Mx", is ensured by the combined loading of the two lower shackles 260 and 262 and of the transverse shackle 302, and finally, the reaction of the bending moment about the Y axis, referred to as "My", is ensured by the combined loading of the upper shackles 252 and 254, of the rear rod 272 and of the lower shackles 260 and 262.

An advantage of the fastening system 250 with this particular arrangement is that the primary structure 202 of the engine pylon 106 has a unidirectional load at each of the six introductions of load, i.e., at each shackle, in order to react independently in the six degrees of freedom, this giving a statically determined fastening system. Furthermore, such an arrangement is less bulky and easy to dimension. Furthermore, such an arrangement results in a pylon primary structure box that is compact, in particular along a horizontal longitudinal axis In this way, the primary structure 202 of the engine pylon is subjected to a unidirectional load at each of the six introductions of load, in order to react independently in the six degrees of freedom, this giving a statically determined system that is referred to as "isostatic".

Furthermore, before the shackles are put in place on the primary structure 202, there is only one of the latter and it can be put in place in the same way for a right-side wing or a left-side wing. In other words, the engine pylon is the same for a right-side wing or a left-side wing, despite the sweep of the wing.

For increased safety ("fail safe"), in particular in the event of a lateral panel 208a-b breaking or cracking, at the join with a shackle 252, 254, 260, 262, each lateral panel 208a-b is reinforced by a reinforcing panel 208a-d that is fastened along the height against the lateral panel 208a-b, in particular by welding, rivets, etc. and that has an orifice for fastening the shackle 252, 254, 260, 262. Thus, in the event of a lateral panel 208a-b breaking at a join, the reinforcing panel 208a-d will take over.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft having a wing and an engine pylon for mounting a jet engine beneath said wing, the engine pylon comprising:
   a primary structure forming a box and having a right-side lateral panel, a left-side lateral panel, an upper spar, a lower spar and a rear rib that closes the box at the rear, a first set of upper shackles and a second set of upper shackles, wherein the first set of upper shackles fastens, in use, the right-side lateral panel to a first structural element of the wing, and wherein the second set of upper shackles fastens, in use, the left-side lateral panel to a second structural element of the wing, a first set of lower shackles and a second set of lower shackles, wherein the first set of lower shackles fastens, in use, the right-side lateral panel to a third structural element of the wing, and wherein the second set of lower shackles fastens, in use, the left-side lateral panel to a fourth structural element of the wing, a fastening element secured to either the rear rib or the lower spar, a rear rod that connects the fastening element to a fifth structural element of the wing, and a transverse shackle that connects the upper spar to a sixth structural element of the wing, wherein a line connecting two centers of the transverse shackle is oriented transversely with respect to a longitudinal axis of the engine pylon, a reinforcing panel, at each join between a right-side lateral panel or a left-side lateral panel and a shackle of the first set or second set of upper or lower shackles, which is fastened along a height against the right-side lateral panel or left-side lateral panel and to which said shackle of the first set or second set of upper or lower shackles is also fastened.

2. The assembly for an aircraft according to claim 1, wherein the shackles of the first set and the second set of upper shackles are oriented with an inclination of between 0° and 45° with respect to a purely horizontal axis.

3. The assembly for an aircraft according to claim 2, wherein the shackles of the first set and the second set of upper shackles are oriented substantially horizontally.

4. The assembly for an aircraft according to claim 1, wherein the shackles of the first set and the second sets of upper shackles are each aligned in a continuation of the right-side or left-side lateral panel to which they are fastened.

5. The assembly for an aircraft according to claim 1, wherein the shackles of the first set and the second set of lower shackles are oriented with an inclination of between 0° and 30° with respect to a purely vertical axis.

6. The assembly for an aircraft according to claim 1, wherein the shackles of the first set and the second set of lower shackles are oriented substantially vertically.

7. The assembly for an aircraft according to claim 1, wherein the shackles of the first set and the second set of lower shackles are each aligned in a continuation of the right-side or the left-side lateral panel to which they are fastened.

8. An aircraft having a jet engine and an assembly according to claim 1, wherein the jet engine is fastened beneath the engine pylon.

* * * * *